Dec. 22, 1931.  D. E. HARPFER  1,838,056
RUBBER CONDUIT
Filed Feb. 27, 1930
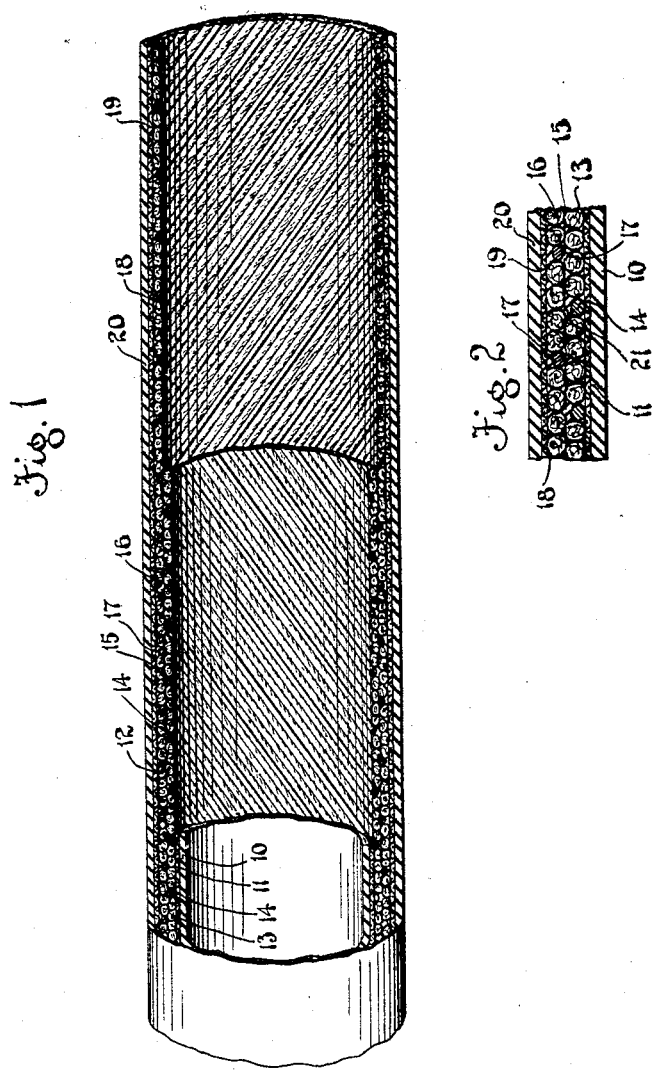
Inventor
Donald E. Harpfer
By
Attorney Patented Dec. 22, 1931

1,838,056

UNITED STATES PATENT OFFICE

DONALD E. HARPFER, OF AKRON, OHIO, ASSIGNOR TO THE GOODYEAR TIRE & RUBBER COMPANY, OF AKRON, OHIO, A CORPORATION OF OHIO

RUBBER CONDUIT

Application filed February 27, 1930. Serial No. 431,738.

This invention relates to conduits and it has particular relation to a conduit in which rubber comprises an important component.

An object of the invention is to provide a conduit which will efficiently withstand very high pressures directed against its inner surface.

Another object of the invention is to provide a conduit which in addition to being able to withstand very high internal pressures, is capable of flexing freely.

Another object of the invention is to provide a conduit which includes spirally disposed elements so arranged that longitudinal and radial expansion of the conduit is reduced substantially to a minimum.

Another object of the invention is to provide a conduit capable of withstanding very high temperatures such as those of steam under high pressures, flowing through the conduit.

Prior to this invention, numerous types of rubber conduits have been manufactured for various purposes such as conducting water and other fluids. Probably most of the prior constructions have been practical, because of the fact that the fluid conducted had relatively low pressures and temperatures insufficient to cause any appreciable deterioration of the conduit. Ordinary conduits are not designed to withstand internal pressures of 200 to 1000 pounds per square inch, or temperatures corresponding to steam having a pressure for example of 200 pounds per square inch. A conduit constructed according to the present invention particularly is adapted to withstand such high pressures and temperatures.

The invention comprises essentially a rubber body having a plurality of layers of cords embodied therein, and in which the cords extend helically of the conduit. The cords in one layer are wound helically in one direction, whereas the cords in an adjacent layer are wound helically in the opposite direction, thereby neutralizing any tendency of the cords in one layer to unwind when higher pressures are directed against the inner wall of the conduit. The direction of helix of the cords in each layer is such that a minimum radial expansion and longitudinal variation in length of the conduit occurs when the inner wall of the conduit is subjected to heat or pressure. The cords in each layer are disposed substantially in contact one with another in order to provide a cord fabric wall substantially impervious to fluids flowing through the conduit which might be forced between the cords if substantial interstices existed between them. Furthermore, the invention contemplates the employment of helically disposed wires or cables arranged at intervals in each layer of cords for the purpose of reinforcing the conduit, particularly when it is subjected to high temperatures. It is apparent that temperatures which might affect the life of the fabric material will not ordinarily affect metallic wires. Experiments conducted on conduits of this character have determined that the metallic reinforcements distributed in the layers of cords substantially increase the ability of the conduit to withstand higher temperatures and pressures without bursting.

For a better understanding of the invention, reference may now be had to the accompanying drawings, forming a part of this specification in which:

Fig. 1 is a fragmentary view, partly cross-sectional and with parts broken away, illustrating a conduit constructed according to one form of the invention; and Fig. 2 is a fragmentary cross-sectional view, on a larger scale, of a wall of the conduit shown by Fig. 1, for the purpose of illustrating clearly the arrangement of the elements comprising the conduit.

Referring to Fig. 1, a tube 10 of rubber comprises the inner layer of the conduit and this layer is surrounded by a layer 11 of ordinary rubberized woven fabric which may or may not be coated with a thin layer of rubber. A layer 12 of cords 13 are wound helically about the fabric 11 under sufficient tension to insure their adherence closely to the latter. Prior to winding the cords 13 about the fabric, preferably, they are immersed in a rubber solution and thereafter dried by any suitable drying mechanism. Consequently, each of the cords 13 is coated with a thin layer of rubber or rubber cement which causes it to adhere readily to the fabric 11. At intervals, a cable 14 of slightly smaller cross-section than the cords 13, is wound helically like the cords 13, and is disposed between certain of the latter. In the particular form of the invention illustrated, between each pair of cables 14, four cords 13 are disposed, although manifestly the number of cords between any two convolutions of cables may be varied as desired. The cords 13 and cables 14 are preferably wound on such an angle that the radial expansion and longitudinal variations of the hose are reduced to a minimum. This angle varies somewhat with different size and style or cords or material.

A thin layer 15 of rubber then is wound about the first layer of cords 13 and the cables 14. Then a second layer of cords 16 is wound helically about the layer of rubber but in a direction opposite that in which the cords of the first layer extend. Cables 17 are arranged in the second layer of cords similarly to the manner in which the cables 14 are arranged in the first layer of cords. Likewise, the cables 17 preferably are of smaller cross-sectional area than that of the cords 16.

Then a thin layer 18 of rubber is wound about the cords 16 and cables 17 and a layer of fabric 19 is wound about the layer of rubber. An outer layer of rubber 20 is wound about the layer of fabric 19. The assembly then is enclosed within a non-rubberized fabric wrapping and the assembly is subjected to a temperature sufficient for vulcanization of the rubber therein. It should be understood that the conduit is built upon an elongate cylindrical mandrel which, during the vulcanization of the conduit, supports the inner wall of the latter. During vulcanization of the conduit, rubber flows between the cords and the cables and between the smaller wires comprising the latter, thereby filling all interstices in the wall of the conduit. It will be noted by an examination of Fig. 2 that about each of the cables 14 and 17, considerable rubber 21 is provided which has a distinct purpose in the manufacture of the conduit. As stated previously, the cables 14 and 17 are of less cross-sectional area than the adjacent cords, which causes the existence of a relatively large interstice above each of the cables. Rubber disposed in these interstices, during vulcanization of the conduit, contacts with the cords at each side of the cables and thereby serves to maintain the cables and the cords in their normal and substantial contacting relation. If the cables 14 and 17 were of the same size as the cords, it is apparent that less rubber would be disposed above each of the cables and, consequently, that the cords at opposite sides of each of the cables would not be connected in the substantial manner that results by reason of having the cables of smaller cross-section than the cords.

While the metallic members 14 and 17 have been defined as cables, it is to be understood that variations in the construction thereof may be resorted to as desired. For example, an ordinary wire may be employed in place of a cable, or a member composed of a plurality of small wires braided together may be used. Metallic members comprising a plurality of small wires are preferred because the conduit is more flexible. Moreover, greater adhesion can be secured between this type of member and the cords and fabric, by reason of the fact that rubber flows into the interstices between the individual wires of the members during vulcanization of the conduit.

Conduits constructed according to the above description, particularly are adapted for conducting steam and other fluids under high pressure. The wires in the conduit are especially desirable when the latter is employed for conducting steam having a high temperature because wires are not affected to any appreciable extent by the heat in the steam. Consequently, even though the heat of the steam should cause some deterioration of the rubber and fabric employed in the conduit, the body of the latter will be prevented from bursting by the two layers or network of wires. Where the conduit is employed for conducting fluids under high pressures having relatively low temperatures, it is not essential that wires be employed, but, on the contrary, an efficient and very strong construction may be provided by employing cords alone. Cords in the conduit are desirable because they cooperate with rubber better than metal wires would cooperate with rubber.

Although only the preferred form of the invention has been described and illustrated, it will be apparent to those skilled in the art that the invention is not so limited, but that various modifications may be made therein without departing from the spirit of the invention or from the scope of the appended claims.

What I claim is:

1. A rubberized conduit comprising a plurality of layers of tensile members, the tensile members being wound helically of the conduit in such manner that minimum radial expansion and longitudinal variation in length of the conduit is secured, the members in one layer being wound helically oppositely to those of an adjacent layer, said members comprising wires and cords wound alternately, the wires being of slightly smaller dimensions than that of the cords.

2. A rubberized conduit comprising a plurality of layers of tensile members, the members in one layer being wound helically oppositely those of an adjacent layer, said members comprising wires and cords wound alternately, the wires being of different diameter from the cords.

3. A rubberized conduit comprising a layer of tensile members, said members comprising wires and cords wound alternately, the wires being of different diameter from the cords whereby an interlocking construction is obtained.

In witness whereof, I have hereunto signed my name.

Signed at Akron, in the county of Summit and State of Ohio, U. S. A., this 25th day of February, 1930.

DONALD E. HARPFER.